Feb. 3, 1953  T. I. LINDHAGEN ET AL  2,627,161
ELASTIC FLUID POWER SYSTEM UTILIZING
A ROTARY ENGINE WITH COOLED ROTORS
Filed May 21, 1952  8 Sheets-Sheet 5

Patented Feb. 3, 1953

2,627,161

UNITED STATES PATENT OFFICE 2,627,161

ELASTIC FLUID POWER SYSTEM UTILIZING A ROTARY ENGINE WITH COOLED ROTORS

Teodor Immanuel Lindhagen and Hans Robert Nilsson, Stockholm, Sweden, assignors, by mesne assignments, to Jarvis C. Marble, New York, N. Y., Leslie M. Merrill, Westfield, N. J., and Percy H. Batten, Racine, Wis., trustees Application May 21, 1952, Serial No. 289,161
In Sweden April 3, 1947

17 Claims. (Cl. 60—39.02)

This application is a continuation-in-part with respect to our copending application Serial No. 776,928, filed September 30, 1947, allowed August 11, 1952, and now abandoned in favor of this application, and relates back thereto as to all common subject matter.

The present invention relates to elastic fluid actuated power systems and has particular reference to such systems of the kind in which motive fluid generated by the heating of a gaseous medium compressed in the system is directly employed for the production of power by expansion in the system.

In all such systems the attainable thermal efficiency of the cycle is largely influenced by the effective heat drop that can be obtained from the motive fluid in the expansion phase, which in turn is largely influenced by the initial temperature of the motive fluid and the amount of heat rejected to the surfaces with which the motive fluid comes in contact while expanding.

Consequently, one objective constantly sought has been the provision of a system enabling the highest possible initial temperature of the motive fluid to be used that can effectively be employed. From this standpoint along the diesel cycle is relatively effective, but has among other limitations the necessity of employing lubricated surfaces which are in contact with the high temperature gases and which consequently must be maintained at relatively low temperature by the aid of a cooling system to which large quantities of the available heat are rejected and lost. The advantages of the gas turbine as a means for utilizing motive fluid having high initial temperature have long been recognized and recent developments in the metallurgical art have supplied materials capable of withstanding temperatures making the cycle practical. However, due to the inherent structural nature and arrangement of turbine blade systems and the stresses to which turbine blades must necessarily be subjected, it has up to the present time proved to be impractical to cool turbine blading to a temperature very materially below the temperature of the motive fluid with which they are in contact. This circumstance thus requires that the maximum temperature of the motive fluid must be limited to a value not materially above the temperature at which the blading will continuously operate under the stress to which it is subjected. With the best materials now available, the maximum initial gas temperature that can practically be used with safety in a turbine having an acceptable length of life is far below that which is desirable from the standpoint of high thermal efficiency, and even the temperatures now in use can be made available only by employing materials which make the turbine structure, and particularly the blade system, extremely expensive.

With the limitations of presently available systems in mind, the general object of the present invention is the provision of a novel power system the nature of which permits, with apparatus constructed of presently available materials, the practical utilization of motive fluid at temperatures very much higher than are practical with gas turbines and in which the several limitations of lubricated reciprocating internal combustion engines are avoided. Other and more particular objects are the provision of a system in which the energy converting surfaces coming in contact with the motive fluid in the expansion phase of the cycle may be operated at higher temperatures than have heretofore been feasible with existing materials, in which, if desired, such surfaces can be uniformly and effectively cooled at a very high temperature level, and in which the cooling of such surfaces may be accomplished in such manner as to avoid substantial thermal loss from rejection of heat from the system because of the cooling.

For the accomplishment of the above noted and other and more detailed objects hereinafter appearing, the invention contemplates the provision of rotary apparatus of the space packed expansible chamber type for the energy converting unit or units of the system. It further contemplates the operation of such apparatus with the dry walls of the space packed working chambers at temperature levels very materially above those possible with lubricated surfaces; further it contemplates the cooling of such surfaces at high temperature level to an extent enabling motive fluid to be expanded from an initial temperature very much higher than even the high temperature of the working surfaces; and still further it contemplates the cooling of the working surfaces by a compressed gaseous fluid which is subsequently heated to high temperature and expanded as motive fluid in the working chambers, the walls of which were previously cooled by the compressed fluid.

For a better understanding of more detailed nature of the invention, reference may be had to the ensuing portion of this specification, taken in conjunction with the accompanying drawings, which disclose suitable examples of apparatus for carrying the invention into effect.

In the drawings:

Fig. 3 shows a longitudinal, horizontal section of engine and outlet end of the compressor taken on the lines III—III of Figs. 1 and 2a.

Fig. 4 shows a transverse section of the engine taken on the line IV—IV of Fig. 2a.

Fig. 5 is a transverse section of the engine taken on the line V—V of Fig. 2a.

Fig. 7 is a transverse section of the engine taken on the line VII—VII of Fig. 2a.

Figure 1:
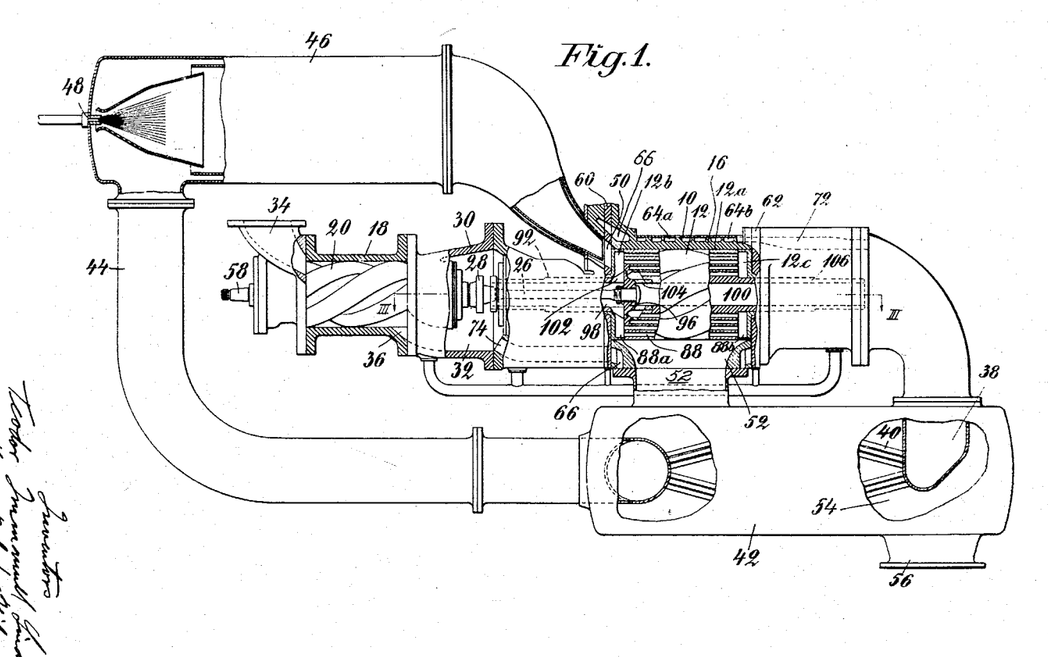
Fig. 1 shows as an example a general arrangement of a system embodying the invention comprising compressor and engine of the positive displacement type together with combustion chamber and regenerator built up to form a single power unit.

Referring now to the system shown in Fig. 1 and related figures the prime mover or engine of the system is indicated generally at 10 and is of the space packed expansible chamber or positive displacement type in which the working chambers are formed by the cooperation of intermeshing rotors 12 and 14 having helical lands and grooves and rotating in a suitable casing structure 16 provided with inlet and outlet ports for admission and discharge of elastic motive fluid. The more detailed construction of the engine will be described later.

The compressor for the system is indicated generally at 18 and advantageously, as shown, is of the same general type of device as the engine, having intermeshing helically grooved rotors 20 and 22 mounted to rotate in a suitable casing 24 to form space packed variable volume chambers for positive displacement compression of elastic fluid, which in the present instance is air. By means of a power shaft 26 and coupling 28 connecting rotors 12 and 20, the compressor 18 is directly driven by engine 10.

In the embodiment illustrated the engine and compressor are assembled to form a single power unit, the casing structure of the engine and compressor being connected by an intermediate housing structure 30, providing among other things a distributing chamber 32 for compressed air delivered by the compressor. Air inducted into the system through the compressor inlet port 34 is delivered through the discharge port 36 to the distributing chamber 32, from whence through suitable channels, to be described more in detail later, the compressed air is caused to flow through the casing structure and rotors of the engine as a cooling medium before being utilized further in the system. In the present system, a regenerator is employed for the recovery of waste heat from the exhaust gases and the air leaving the engine, after performing its cooling function, flows through duct 38 and suitable heat exchange tubes 30 in a suitable regenerator 42 to the duct 44 connecting the regenerator with a combustion chamber indicated generally at 46, to which fuel is supplied through a suitable burner 48 for combustion with the air to produce high temperature motive fluid comprising products of combustion for expansion in the engine. From the combustion chamber the motive fluid is admitted through the inlet port 50 of the engine to the working chambers and is exhausted from the latter through port 52 to the gas space 54 of the regenerator, which discharges to waste through the outlet 56.

Net useful power from the system for carrying external load is taken off through the power shaft 58 connected to the compressor rotor 20 to which power is delivered from engine 10.

Referring now more particularly to Figs. 2 to 7 for the more detailed nature of the construction of the present embodiment, the engine casing comprises a central barrel member 58 closed at its ends by platelike end members 60 and 62, member 60 providing the inlet 50 for motive fluid. The barrel 58 is provided with a series of perimetrally extending cooling passages 64 divided into groups 64a and 64b, through which cooling air flows.

Air is admitted to the group 64a from an annular admission chamber 66 through top ports 68 (Fig. 4) and flows downwardly around the barrel to ports 70 through which it passes to group 64b. Through the latter it flows upwardly to be discharged from the casing through passage 72 connected to the duct 38. The admission chamber 66 is connected by means of the duct 74 to the distributing chamber 32. An annular cooling channel 76 is provided around the wall of the exhaust port 52. This channel is supplied with air through port 78 communicating with passage 74 and discharges through a suitable port 80 to a chamber 82 in the housing number 84. From chamber 82 the air flows to the duct 38 by way of port 86 communicating with the passage 72.

The rotors 12 and 14, in the embodiment shown, are of built up construction comprising annular central members 12a and 14a respectively, and end members 12b and 14b and 12c and 14c respectively. The central members 12a and 14a are for manufacturing reasons advantageously built up of welded together sections, as shown, and are provided with a large number of cooling passages 88 and 90, extending longitudinally of the lands of the rotors and so disposed with reference to the surfaces of the lands and grooves that effective and uniform "skin" cooling of the rotor surfaces may be obtained. As will be seen particularly from Fig. 4, the size and number of cooling passages provided are such that their surface area exceeds that of the external surface of the rotor lands and grooves, to provide what is in effect extended, cooling surface, a consideration of importance as will hereinafter appear.

Figure 2A:
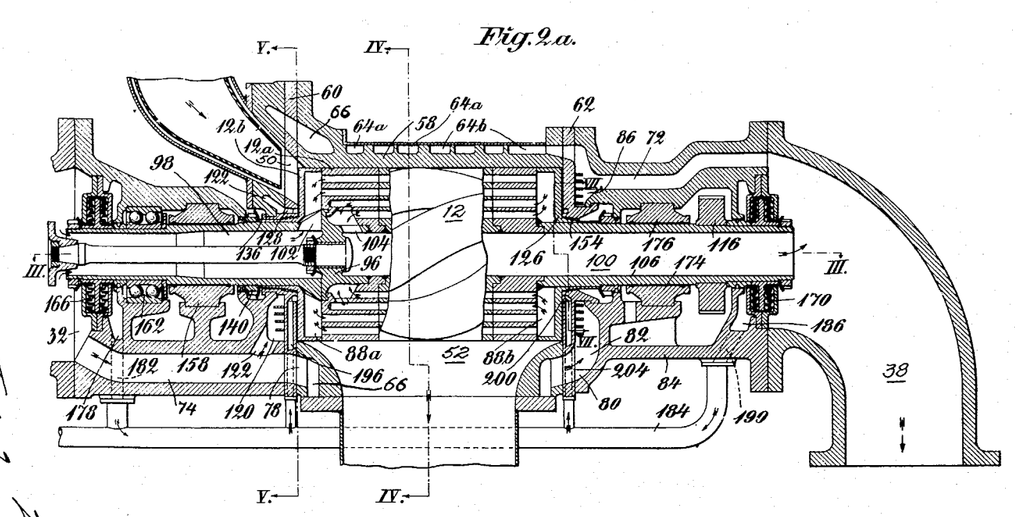
Fig. 2a shows a longitudinal, central section of the engine of Fig. 1.

As will be seen from Fig. 2a, the end members of the rotors are of cuplike form, providing annular distributing chambers 88a and 88b, and 90a and 90b in the respective rotors.

At the driving end of the engine, the rotors are mounted by means of hollow shafts 92 and 94 respectively, both of which project at their open ends into the distributing chamber 32. The driving shaft 26 is fixed to the central member of the body of rotor 12 by means of a connection 96 which blocks the flow of air from the annular space 98 between the drive shaft and the hollow rotor shaft 92 to the central bore 100 of the rotor body member 12a. The shaft 92 is provided with ports 102 for flow of air to the distributing chamber 88a, which in turn delivers it to the radially outer group of cooling channels 86, the inner group being blocked off from communication with chamber 88a as will be seen from Fig. 2a. The air flow is thus through the outer group to chamber 88b and back through the inner group, the latter discharging by way of radial ports 104 to the central channel 100. The other ends of the rotors are carried by hollow shafts 106 and 108 respectively and as will be seen from Fig. 2a the central bore 100 of rotor 12 communicates with the bore of shaft 106 to discharge cooling air to the duct 38. The cooling arrangement for rotor 14 is similar to that described in connection with rotor 12 and need not be repeated in detail, except to note that owing to the absence of a driving connection such as connection 96 in rotor 12, a blocking diaphragm 110 (Fig. 3) is provided to force the cooling air from shaft 94 to the distributing chamber 90a.

Figure 4:
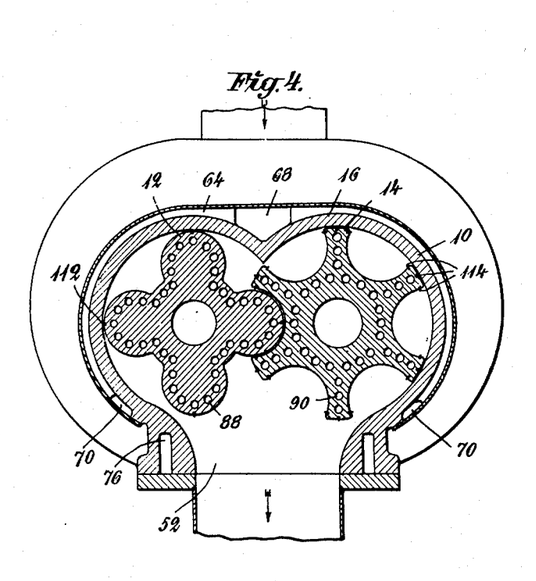

While insofar as the present invention is concerned in its broader aspects, the specific form and profile of the rotors and other details of the engine are not critical, the preferred profile is that shown in Fig. 4, which forms the claimed subject matter of the application of Hans Nilsson, Serial No. 684,495, filed July 18, 1946, abandoned in favor of his continuation-in-part application Serial No. 761,265, filed July 16, 1947, and granted December 23, 1952, No. 2,622,787. The primary reason for this preference is that it permits the practical employment of sealing strips or fins 112 and 114 for the purpose of reducing to a minimum the clearance space between the rotors and between the rotors and casing. The proper phase relation between the rotors is maintained by suitable timing gears 116 and 118 mounted on shafts 106 and 108 respectively, and for the high temperature level that is contemplated for operation of the engine, the use of sealing strips is highly advantageous, since it permits the use of commercially more practical clearances to be provided between the rotor and casing surfaces without reducing efficiency because of excessive leakage through the "space packing" provided by the clearances, than would otherwise be possible. Also, if in actual use abnormal circumstances arise, as for example excessive wear of the timing gears or unusual changes in dimensions owing to abnormal thermal expansion or contraction of the parts, the larger clearances diminish the chance of rubbing contact between large surface areas of rotors and/or casing. Rubbing contact by the sealing strips due to abnormal conditions is not seriously harmful and such strips may readily be replaced if badly worn or damaged by accident. So far as the number and material of the rotors employed, the number of lands and grooves, helix angle, specific port design and other like factors are concerned, these will be determined by the specific conditions of capacity, pressure, expansion ratio, temperature and other factors affecting the design for a given purpose and may vary widely within the scope of this invention. The determination of such design factors in apparatus of the general type under consideration is well known and need not be enlarged upon herein for an understanding of this invention.

Reverting to the factor of providing adequate and uniform cooling for the engine, the present embodiment provides for cooling of the end walls of the casing and rotors and the high temperature ends of the rotor shafts by means now to be described. The housing structure adjacent to the end plate 60 provides a chamber 120 (Figs. 2a and 3) extending around the rotor shafts and supplied with high pressure cooling air through port 122 leading from the passage 74. As will be seen more clearly from Fig. 5, the face of the end plate 60 facing the rotors is provided with grooves 124 and 126 extending around the rotor shafts on the inlet or high pressure side of the engine and in communication with chamber 120 through ports 128 and 130 respectively in the end plate. High pressure cooling air flows from these grooves into the clearance spaces between the rotor ends and the end plate and a part flows from the clearance space into the engine to mingle with the motive fluid. Another part flows from the clearance space through the packings 132 and 134 between the hub portions of the rotor members 88a and 90a respectively and the shaft openings in the end plate. These packings are of well known form of the so called leakage or labyrinth type which depend for their sealing effect on the pressure drop of leakage fluid flowing through restricted clearances in the packing. In this instance the leakage air acts to cool the shaft ends and is discharged from the seals to atmosphere through the venting spaces 136 and 138 provided between the stationary housing structure and the retaining nuts 140 and 142 which clamp the rotor and members 88a and 90a in place. The end plate 60 is provided with cooling fins 144 providing extended surface cooled by the flow of air through chamber 120. At the opposite end of the rotors the cooling on the high pressure side is similarly effected. The chamber 82 facing the end plate 62 supplies high pressure cooling air to channels 146 and 148 (Fig. 7) through ports 150 and 152 for flow through the end clearance space in the engine and through the shaft seals 154 and 156 to atmosphere.

On the lower or exhaust side of the engine, the pressure difference between the motive fluid and the high pressure air is such that it is desirable to provide air at lower pressure to cool the rotor ends and in this construction this is provided for in the following manner.

At the driving end of the engine, the shafts 92 and 94 are carried by bearings 158 and 160 and there are further provided the thrust bearings 162 and 164 for taking the axial thrust of the rotors. From the standpoint of lubrication of these bearings it is desirable not to have the chamber in which they are located under pressure and seals of the leakage or labyrinth type, shown at 166 and 168 are provided to prevent compressed air from flowing from the distributing chamber 32 to the bearing chamber.

Similarly, such seals, shown at 170 and 172 are provided to prevent flow of compressed air from the duct 38 to the chamber housing the timing gears 116 and 118 and the bearings 174 and 176 carrying the rotor shafts 106 and 108.

On the low pressure side of the packings 166 and 168, chambers 178 and 180 are provided to collect leakage air, which is discharged through a suitable connections, one of which is shown at 182 in Fig. 2a, to a manifold 184. Similarly, leakage air from seals 170 and 172 is collected in chambers 186 and 188 and delivered to manifold 184 through one or more connections 190. These seals and their connections thus serve a twofold purpose. They eliminate pressure from the bearing chambers due to the compressed air and they make available a supply of leakage air at reduced pressure suitable for cooling the low pressure sides of the rotor ends. This cooling is accomplished in much the same fashion as previously described for the high pressure side. The end plate 60 is provided with grooves 192 and 194 (Fig. 5) on the low pressure side receiving low pressure air from manifold 184 through connections 196 and 198 in the end plate, which are in turn connected with the manifold. Likewise the low pressure air is supplied to the low pressure side of the rotors at the other end through grooves 200 and 202 (Fig. 7) and connections 204 and 206.

Figure 5:
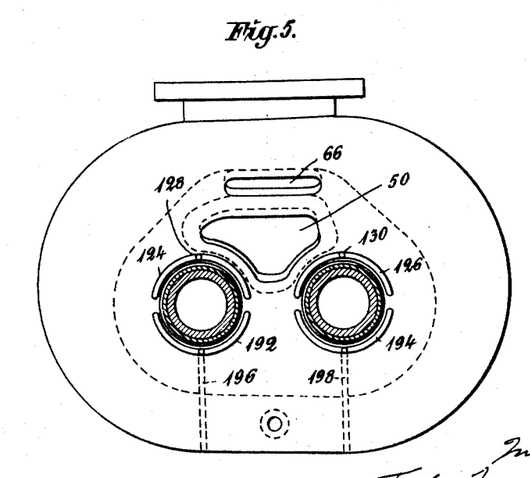
Figure 6:
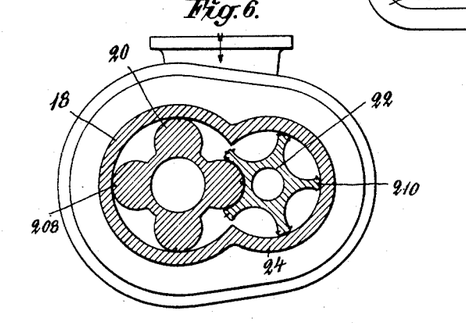
Fig. 6 is a transverse section of the compressor taken on the line VI—VI of Fig. 2b.
Figure 7:
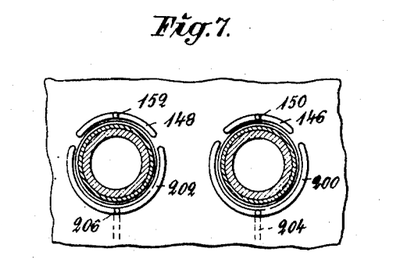

It will be observed from comparison of Figs. 5 and 7 that the high pressure grooves 124 and 126 in the inlet end plate 60 are considerably longer than the high pressure grooves 146 and 148 in the end plate 62, with the low pressure grooves 192 and 194 in plate 60 correspondingly shorter than grooves 200 and 202 in plate 62. The reason for this is that due to the helical form of the grooves providing the working chambers, the latter are peripherally wider at the inlet end than at the opposite end when they register with the outlet port and the pressure in them falls.

In the embodiment shown, the compressor 18 is of the same general type of screw wheel device as the engine 10 and with the rotors preferably having profiles of the form disclosed in the previously mentioned Nilsson application Ser. No. 684,495, which permits the employment of packing strips 208 and 210 what in turn enable clearances of commercially desirable magnitude to be used without impairing efficiency. Since the general type of compressor is known (see U. S. Patent No. 2,243,874 for example) it need not be described in detail here, except that it should be noted that depending upon desired capacity, compression ratio, speed of operation and like factors the number of rotors, number of grooves per rotor, helix angle and port design may vary, as in the case of the engine. If desired the compressor may be cooled, but ordinarily, if cooling is employed it will be sufficient to simply jacket the casing for a cooling medium such as water, since the temperature level of the compressor is very low relative to that of the engine.

Figure 2B:
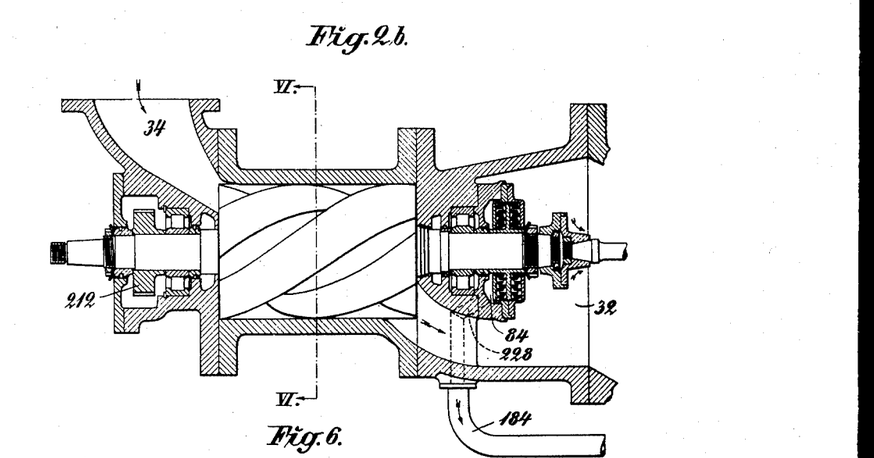
Fig. 2b shows a longitudinal, central section of the compressor of Fig. 1.
Figure 3:
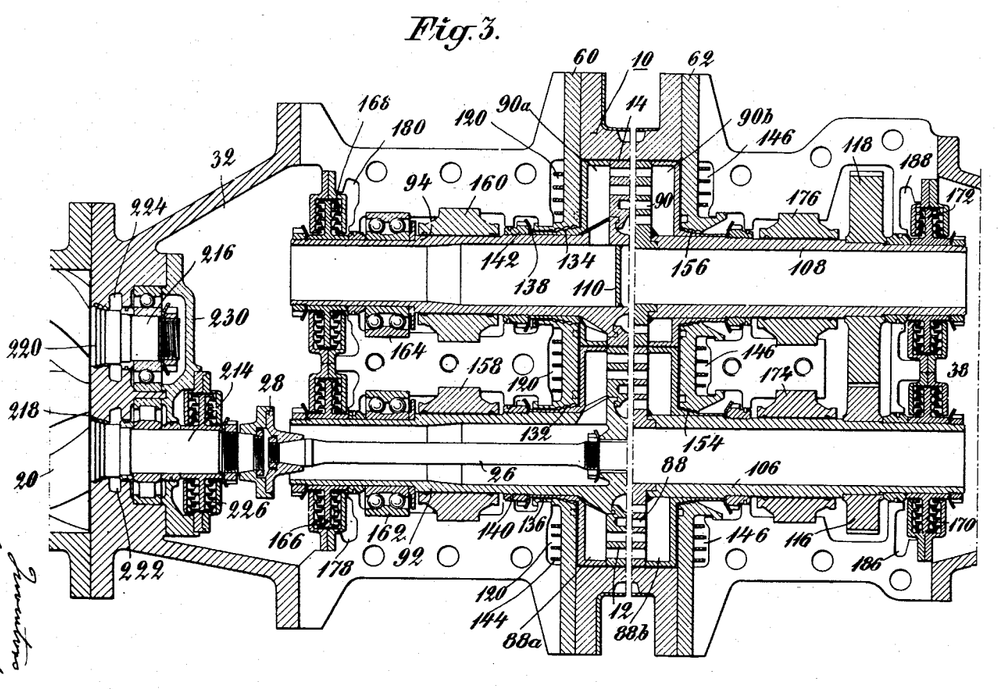

In the present design, the compressor rotors 20 and 22 are carried in suitable bearings including bearings for taking axial thrust load, and the rotors are maintained in their proper phase relation by timing gears one of which is shown at 212 in Fig. 2b. At the high pressure end of the compressor the rotor shafts 214 and 216 are provided with leakage type seals 218 and 220 discharging to vented chambers 222 and 224 and the shaft 214 is sealed by a further leakage type seal 226 the flow from which is carried by connection 228 to the low pressure cooling air manifold 184. A cover plate 230 covers the end of shaft 216, and as will be evident from the drawing, the bearing chamber at the high pressure end of the compressor is thus maintained free from pressure. This arrangement, in conjunction with the arrangements provided for the bearing chambers of the engine, thus enables a single lubricating system to be employed from which lubricant can be supplied to all parts requiring it, at a common pressure.

From the foregoing description the operation of the apparatus will largely be apparent, but the nature and magnitude of the advantages obtainable are not wholly obvious and certain of the major advantages should therefore be pointed out.

As previously noted, the absence of internal lubrication in the engine enables the working surfaces to be operated at highly elevated temperatures limited only by the strength of the material to withstand the operating conditions. The nature of the engine also contributes to the possibility of high operating temperature, since it is characteristic of the type of apparatus employed that at rotor peripheral velocities suitable for highly efficient operation, the mechanical stresses imposed on the rotors by centrifugal force and other factors are comparatively low, which in turn permits a given material to be operated safely at higher temperature than would be the case under more severe stress conditions. Additionally the relatively continuously smooth working surfaces permit of much more effective and uniform cooling of these surfaces with absence of local hot spots than can for example be practically accomplished in the case of turbine blading, the thin exhaust edges of which are particularly difficult to cool and which moreover are subject to the most severe working conditions. In contrast with this, the packing strips employed in the present construction project such a short distance from the cooled rotor bodies (in a typical case a matter of about .01 to .02 inch in an engine having rotors of approximately 4 inches diameter) that the temperature difference between the roots and crests of the strips is not material. Furthermore, the cross section of the sealing strips may be made with triangular or similar cross section for facilitating heat conduction from the crests to the roots. Calculations show that for a practical and efficient design, surface temperatures of the order of 300° C. may be used with rotors of light weight metal such as the available aluminum alloys, while with mild steel temperatures of the order of 450° C. may be maintained and in the case of special materials such as stainless steel the working temperature may safely be of the order of 700° C. As better heat resistant materials are developed even higher surface temperatures may be attained.

Because the form of the apparatus affords the possibility of providing extended cooling surface close to the working surface, the extent of cooling that can be effected even with a gaseous cooling medium is such that a high temperature differential can be maintained between gas temperature and that of the working surfaces.

Calculations show that a teemperature differential of as high as of the order of 800° C. may be obtained, so that even with the light weight metals which have relatively low maximum operating temperatures, initial gas temperatures of the order of 1100° C. are attainable, while with metal such as presently available stainless steel and other high temperature resistant alloys, initial temperatures of the order of 1500° C. may be reached. It is evident that such temperatures define an operating range far above that presently obtainable with gas turbines using even the best materials now available, this being due primarily to the facts that on the one hand it has not been found practical, in spite of many attempts, to maintain in an efficient turbine a temperature differential between the gas temperature and the hottest portions of a cooled blade system, of more than approximately 100° C., if that, and on the other hand that the mechanical stresses in the rotor blading of an efficient turbine are unavoidably high. Because of these and other limitations the highest safe initial temperatures for gas turbines utilizing the best of presently available materials is considered to be in the neighborhood of 800° C. while in the most successful systems so far actually built and operated, initial temperatures of the order of 700° C. are used. From a technically economical standpoint the lower limit of the temperature difference between the inlet gas temperature and the working temperature of the engine rotors in an apparatus according to the invention should suitably not be less than of the order of 200° C.

Because of the very much higher initial temperatures possible with systems embodying the present invention, the quantity of motive fluid that has to be circulated for a given energy output is very materially reduced, with consequent reduction in the size, weight and cost of apparatus required for a given energy output.

To obtain high thermal efficiency in any system of the kind under consideration, the use of a regenerator to recover heat from motive fluid exhausted from the prime mover is necessary, and the present invention is particularly advantageous because of the great extent to which the size of regenerator required for an efficient cycle can be reduced as compared with previous systems of like efficiency. For a typical system of the kind embodying the present invention and designed for an overall thermal efficiency of around 30% with an inlet gas temperature of 1200° C., the area of regenerator surface required is only approximately 60° of that required for a gas turbine system of like efficiency, even with the latter calculated on the basis of an inlet temperature of 800° C., which is above the value now employed in the latter type of system. Since regenerator structures are relatively bulky and heavy items of equipment, a saving of such magnitude is of material importance in systems intended for use in the aircraft field.

A further material advantage inherent in the present system is the fact that relatively high thermodynamic efficiency is obtainable with engines of small size and of the type contemplated. Consequently, efficient systems of much smaller power can be constructed than appear possible with turbine systems giving comparable results.

While in certain of its broader aspects the invention is not restricted to the utilization of rotary positive displacement compressors, the use of such a type, for at least one or more stages of compression, is much to be preferred to wholly dynamic compression. The basic reason for this is that because of the similarity of operating characteristics between the power producing and the compressing units of a system wherein positive displacement apparatus is used in both, the variations in efficiency, capacity and other factors of the two sides of the system, under different conditions of speed and load, so closely match one another that highly efficient operation of the system as a whole may be maintained over a relatively wide range of speeds and loads. Also, with positive displacement compression embodied in the system, a degree of stability is obtainable, even with sudden speed and load changes of considerable magnitude, that is difficult if not impossible to obtain with wholly dynamic compression.

While for the purposes of obtaining the desired cooling of the engine by liquid or other fluid media is within the scope of the broader aspects of the invention it will be evident that the use of a gaseous medium is highly advantageous, particularly for the purpose of cooling the rotors. At the high temperature levels contemplated, cooling in the liquid phase, even with high boiling point liquids, would be difficult if not impossible, except with a high pressure system, to keep tight. Moreover, from the standpoint of uniformity of cooling, the cooling passages should be as close as practical to the surfaces requiring cooling. This requires, for the most satisfactory rotor cooling, passages at considerable distances from the axis of rotation, with consequent increase in centrifugal force stresses with liquid versus gaseous cooling. Additionally, the preferred gaseous cooling by a cooling medium which is subsequently utilized to produce motive fluid for operating the system, avoids the thermal loss inherent in any system, liquid or gaseous, which employs an independent cooling system to which heat is rejected.

Figure 8:
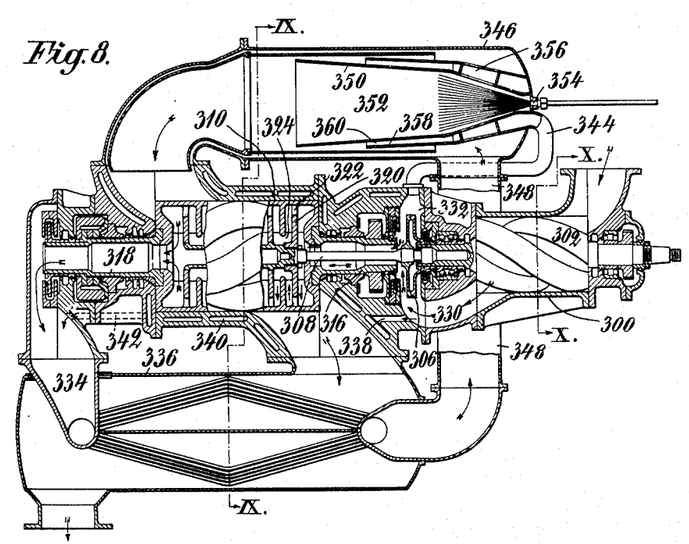
Fig. 8 is a longitudinal, transverse section similar to Fig. 1 of an arrangement in which the air supply is utilized partly for engine cooling and partly for cooling the combustion chamber, the section being taken on line VIII—VIII of Figs. 9 and 10.
Figure 9:
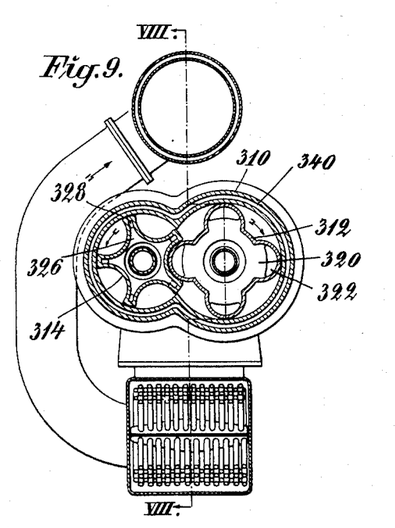
Figs. 9 and 10 are cross-sections taken on the lines IX—IX and X—X of Fig. 8 showing engine and compressor structure.
Figure 10:
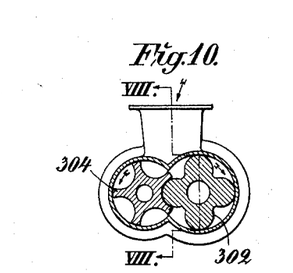

The initial temperature level of the motive fluid usable with the present invention may be so high that in some instances it may be desirable to provide for special cooling of the combustion chamber as well as the engine. This of course can be accomplished by a separate cooling system for the combustion chamber. Such an expedient, however, results in a thermal loss from the system which is undesirable. Since the total quantity of compressed air available may in certain cases be more than required to adequately cool the engine, the air supply may in such instances be divided with one portion being utilized for engine cooling and another for cooling the combustion chamber. An arrangement of this kind is illustrated in Figs. 8 to 10. In this embodiment the compressor 300, having rotors 302 and 304, is essentially of the same construction as previously described and through coupling 306 and shaft 308 is driven by engine 310 having rotors 312 and 314. As in the previously described embodiment the engine rotors are provided with hollow shafts, those of the rotor 312 appearing at 316 and 318 in Fig. 8. In this case the form of the rotor bodies, insofar as cooling surface is concerned, is different from the previously described form. As shown in Figs. 8 and 9 the body of rotor 312 is provided with spaced radially extending diaphragms or baffles 320 provided with ports 322 and 324 located to produce zig-zag flow of cooling air through the rotor as indicated by the arrows in Fig. 8. The rotor 314 is similarly provided with baffles 326 similarly ported to produce zig-zag flow, certain of the ports appearing at 328 in Fig. 9. As will be evident from the drawing the internal baffles provide extended cooling surface and further provide for flow of the cooling air giving effective and uniform "skin" cooling of the working surfaces of the rotors.

Air from the compressor passes through the duct 330 to the distributing chamber 332. From this chamber a portion of the air flows through the rotors to the duct 334 leading to the regenerator 336. Another portion flows through one or more passages 338 to the jacket spaces 340 in the housing structure and from the latter to duct 334 through connections 342. Still another portion flows through connection 344 to the combustion chamber 346 to which air also flows from the regenerator through duct 348.

In the construction shown the combustion chamber is provided with an inner shell 350 providing an inner chamber 352 to which fuel is supplied through burner 354. Air for combustion is supplied to chamber 352 through ports 356 communicating with duct 348. An intermediate shell 358 is provided which surrounds the burner end of the inner shell in relatively closely spaced relation to provide an annular cooling chamber 360 to which cooling air from connection 344 is admitted and from which the air flows to the main chamber space of the combustion chamber.

From inspection of Fig. 8 it will be evident that the air reaching the combustion chamber through connection 344 will be at higher pressure than that reaching the chamber through duct 348, since the latter supply has a certain pressure drop caused by its flow through the engine cooling system and the regenerator, while the former flows through a direct connection from the distributing chamber 332. This pressure differential is utilized to create high velocity flow of cooling air through the jacketing chamber 360, capable of exerting substantial cooling to the inner shell 350 which is subjected to the most intense heat of the combustion zone.

While for the sake of simplicity the embodiment shown in Figs. 8 to 10 has been illustrated more or less diagrammatically it will be understood that advantageous details of construction shown in Fig. 1 and related figures may equally well be utilized in the embodiment just described.

In the embodiment above described, labyrinth or leakage type seals are employed for both the engine and compressor components, the leakage air from which is usefully returned to the system to aid in externally cooling the ends of the rotors exposed to the high temperature motive fluid.

From the standpoint of the overall thermal efficiency of the system, however, it is advantageous to convert all of the fluid upon which work of compression has been done to high temperature motive fluid at the desired inlet temperature for expansion from that temperature in the system. To secure such a result in a system embodying the principles of the present invention requires that the compressed fluid passed through the engine rotors and/or casing for cooling purposes be sealed off or isolated from the passages and/or working chambers for the expanding motive fluid, and we have found that this isolation of the two fluids from each other can successfully be accomplished by means of apparatus of the kind shown in Fig. 11 and related figures.

Figure 11:
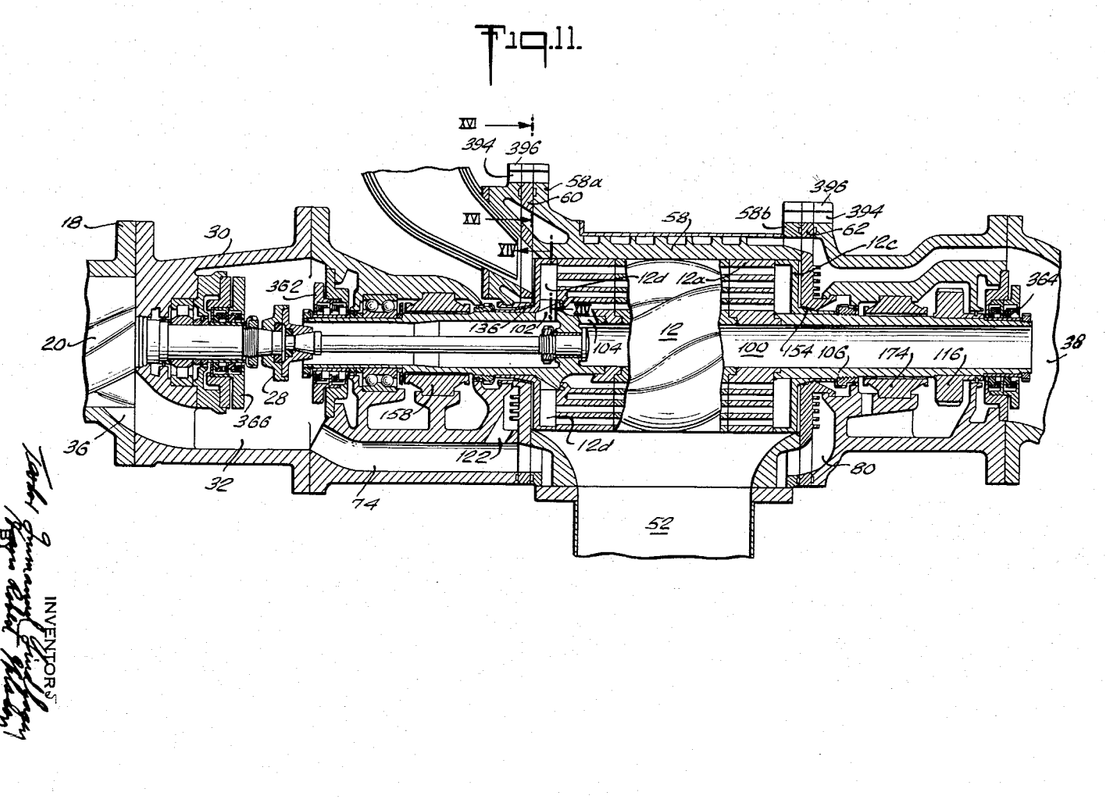
Fig. 11 is a view similar to Fig. 2a showing a different embodiment of engine-compressor unit suitable for use in a system as shown in Fig. 1.

As will be observed from comparison of Fig. 11 with Fig. 1, the engine-compressor unit shown in the former is adapted to be substituted for the similar unit shown in the system illustrated in the latter, and as to general organization the two structures are similar, like parts being designated by like reference characters. In the embodiment shown in Fig. 11, the principal differences from the embodiment shown in Fig. 1 reside in the substitution of carbon ring seals in place of the leakage type seals, whereby to isolate the cooling and motive fluids from each other, and in changes in the rotor and casing structures to compensate for the lack of cooling effect from leakage fluid from leakage type seals.

Figure 12:
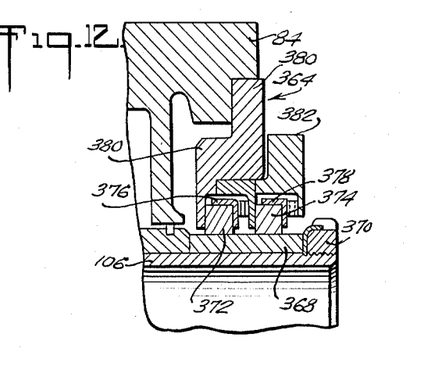
Fig. 12 is a fragmentary section on enlarged scale of one of the seals shown in Fig. 11.

Referring now more particularly to Fig. 11, it will be seen that the leakage type seals 166 and 170 shown in Fig. 2a have been replaced by carbon ring type seals 362 and 364 respectively, it being understood that the leakage type seals 168 and 172 (Fig. 3) for the female rotor shaft are also replaced by similar carbon ring seals not visible in Fig. 11. Additionally, the compressor seal 226 (Fig. 3) of leakage type is replaced by a carbon ring seal 366. Since these carbon ring seals are all of essentially the same construction it will be sufficient to describe seal 364, shown on enlarged scale in Fig. 12. As seen in this figure the shaft 106 carries a hard surfaced bearing or sealing sleeve 368 retained by nut 370 and against which the carbon rings 372 and 374 bear to effect the desired seal. Rings 372 and 374 are encircled by metal backing rings 376 and 378 which take up the radial pressure exerted between the sealing surfaces. The backing rings are suitably connected to retaining members 380 and 382 by connections permitting the sealing rings to properly align themselves with the sealing surface, the retaining members in turn being anchored to the housing 84 by suitable fastening means, not shown.

Figure 13:
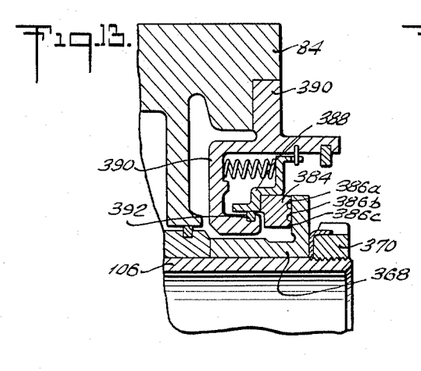
Fig. 13 is a view similar to Fig. 12 showing another form of such seal.

In some instances it may be desirable to use other specific forms of carbon ring seal and in Fig. 13 there is shown another suitable embodiment providing a radial sealing surface against which the carbon ring is resiliently pressed to effect the seal. In this embodiment the sealing sleeve provides a radial sealing surface 368a against which a carbon ring 384 is yieldably pressed by spring 386 acting on the backing ring 388. The carbon ring is circumferentially grooved to provide radially separated bearing faces 386a, 386b and 386c and relative axial movement between the backing ring 388 and the fixed retaining member 390 is permitted without leakage between these parts (which do not have relative turning movement) by the metal piston ring seal 392.

Figure 14:
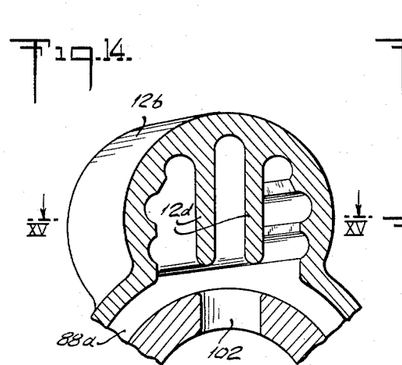
Fig. 14 is a fragmentary view on enlarged scale taken on line XIV—XIV of Fig. 11.
Figure 15:
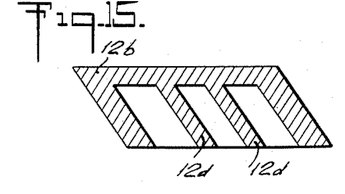
Fig. 15 is a section taken on line XV—XV of Fig. 14.

With positive sealing means such as above described, or equivalent sealing means operable under the temperature conditions encountered, leakage air is not available for introduction between the ends of the rotors and the casing end walls for cooling purposes, but we have found from actual operation that adequate cooling of the end walls of the rotors may be secured by providing extended cooling surface for the internal skin cooling of the rotor end members such as members 12b and 12c shown in Figs. 11, 14 and 15. In the embodiment illustrated the end member 12b is provided, in each of its land portions, with internal radially extending ribs 12b located to register with the ends of the cooling channels 88. Also as seen more particularly in Fig. 14, the inner wall surface of the land portions may be given slightly extended area by being ridged as shown, to register with the ends of channels 88.

Figure 16:
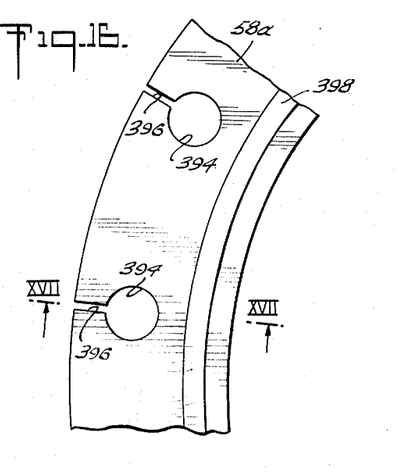
Fig. 16 is a fragmentary view on enlarged scale taken on line XVI—XVI of Fig. 11.
Figure 17:
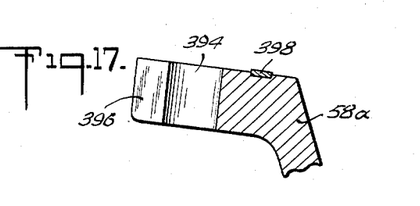
Fig. 17 is a section on line XVII—XVII of Fig. 16.

As will be evident from Figs. 1 and 11, the casing structure is subjected to different temperatures and temperature stresses around the circumference of the engine and in order to relieve the structure from localized temperature stresses and distortion in the flanged barrel and end plate housing construction that experience has shown provides a satisfactory form of housing, the flange portions of the components are relieved in the manner shown in Figs. 11, 16 and 17. As shown in these figures, the flanges 58a and 58b of the barrel part 58, the end plate 60 and 62 and the flanged portions of the adjacent housing members are bored, as at 394, for clamping bolts (not shown) and the portions of the flanges and end plates outside the bolt holes are relieved by means of generally radially extending slots 396 which divide the outer portions of the clamped parts into a number of segments. With this construction, the radially inner parts of the clamped structure, which are subjected to the highest temperatures, may expand and contract more freely and with less tendency to be warped than if restricted by circumferentially rigid outer flange portions at lower temperature. Also, for maintaining a gas tight seal between the high temperature parts, sealing strips 398 of compressible and high temperature resistant gasketing material such as asbestos compounds and the like may advantageously be used, such gaskets being received in grooves of less depth than the initial thickness of the gasket and the latter being compressed when the parts are drawn together by the clamping bolts.

While as previously noted, specific details of rotor profiles, numbers of lobes, helix angles, etc. are not critical and may vary as between different specific designs, there are certain fundamental characteristics of the apparatus employed, particularly the engine, that are of major importance for reasons hereinafter explained.

It is characteristic of rotary machines of the kind herein disclosed and also disclosed in the previously mentioned Lysholm patent and Nilsson application, that the total wrap angle of the rotor lands is less than 360°, usually materially less. When the wrap angle is less than 360°, the working chambers vary in axial length as the rotors revolve, the axial length being defined between a place axially fixed relative to the rotors and casing, such as an end wall of the casing, and a place at which a rotor land meshes with a cooperating groove, the latter place moving axially relative to the rotors and casing as the rotors revolve, to vary the length of the chamber. This characteristic construction is of great importance from the standpoint of enabling sufficient cooling of the rotors to be effected to maintain the great degree of temperature difference between high inlet gas temperature and the moderate rotor temperature, which is characteristic of the invention, while at the same time not rejecting to the cooling system so much heat from the high temperature part of the thermal process as to materially reduce or cancel the thermal advantage accruing from the high initial gas temperature. Primarily, the reason for this is due to the fact that with the kind of rotor construction and working chamber under consideration, the inlet ends of the rotor lands are subjected to the high initial gas temperature only during the inlet or admission phase of the cycle. As soon as any one expansion chamber is cut off from the inlet port the temperature of the gas in the chamber drops as the gas expands and continues to drop until the exhaust phase of the cycle is reached. However, during both the expansion and exhaust phases of the cycle the chamber is still in part defined by the inlet end portions of the rotor lands, so that these portions, which are the only parts of the rotors exposed to the high initial gas temperature, are exposed to that temperature for only a minor portion of the total time of the cycle, since the inlet phase of the cycle is ordinarily only of very short duration as compared with the duration of the combined expansion and exhaust phases of the cycles. Thus the average gas temperature to which the "hot" or inlet ends of the rotors are subjected is very much lower than the inlet gas temperature and since the "cold" or exhaust ends of the rotors are only subjected to exhaust gas temperature, there is ample opportunity for flow of heat by conduction along the lands from the hot to the cold ends of the rotors, thus even without additional cooling tending to maintain a relatively great temperature difference between inlet gas temperature and the highest rotor temperature.

The above is in direct contrast to the conditions existing in turbines where the inlet stage or stages are subjected substantially continuously to inlet gas temperature and operate at substantially gas temperature. It is also to be noted that from the standpoint of operating temperature, helical rotor machines of the kind in which the wrap angle is more than 360° and thus having working chambers defined between successive places of intermeshing between lands and grooves, so that the chambers "travel" as a whole along the rotors as the rotors revolve, are subject to the same difficulties from a heat standpoint as a turbine, since the inlet ends of the rotors are never contacted by materially expanded or exhaust gas of much lower than inlet temperature.

In order to illustrate the above described and other advantageous characteristics obtainable with apparatus of the kind herein disclosed for carrying the invention into effect, the following is noted by way of example but without limitation, with reference to a test engine of the kind substantially as shown in Figs. 1 and 11. In the engine under consideration the rotor length is 230 mm., the male rotor having four lands, being 150 mm. in diameter and the female rotor, having six lands, being 158 mm. in diameter (see Fig. 4). The total wrap angle is approximately 200° and the inlet and exhaust porting is designed for an expansion ration of four to one from a maximum inlet press of pressure of approximately 43 p. s. i. gage. The material of the rotors is an ordinary mild chrome machine steel of the order of 0.10%–0.15% carbon and 1.5% chrome and the engine is capable of designed operation at speeds up to 20,000 R. P. M. with maximum gas inlet temperature of the order of 1350°–1400° C.

Much test operation has been carried out at 1200° C. and at speeds of 15,000 R. P. M. or better with external load of the order of 50 to 100 H. P. It is therefore appropriate to consider the heat conditions prevailing with such an inlet temperature. With inlet temperature of 1200° C. the exhaust temperature is of the order of 600° C. but the mean gas temperature to which the rotors are exposed is only of the order of 700° C. for the reason that, as previously explained, each land is exposed to the temperature of partially expanded or exhaust gas for the greater portion of the time. The extent to which this is so is shown by the fact that with rotors of the specification given above, the inlet phase of the cycle for a given land covers some 70°–80° of rotation, the expansion phase covers some 130°–140° of rotation while the exhaust phase (which is equal to the wrap angle plus the pitch angle between successive lands) covers some 290°.

Under such conditions and with the rotors skin cooled by compressed air flowing through passages of the kind shown in the figures referred to, the rotor temperature at the inlet end is of the order of 500° C. and at the outlet end of the order of 400° C. giving a mean rotor temperature of the order of 450° C.

With a mean gas temperature of the order of 700° C. it is thus evident that the cooling system has to absorb only enough heat to maintain a difference of some 250° C. between mean values, even though at the inlet end of the machine a temperature difference of the order of 700° C. is maintained between gas temperature and rotor temperature.

A further factor enabling a relatively large temperature difference to be maintained between the high temperature inlet gas and the walls of the chambers formed by the rotors and the casing is the fact that the velocity of the hot gases relative to the walls of the chambers is quite low as compared with other kinds of machines, particularly turbines. In an engine of the kind under discussion, the relative velocity of the gas over the working surfaces at normal operating speed is only of the order of 100 meters/second, even with straight axial inlet and outlet flow, which gives the highest relative velocities in this type of machine. This is in contrast with relative velocities of the order of 1000 meters/second or more between gas and turbine blading in practical gas turbine practice. Since the rate of heat transfer from gas to solid is a function of the relative velocity between the two, the great difference in the rate of heat absorption between the two kinds of apparatus is immediately evident.

As a result of the several factors discussed above and other minor factors, both calculations and test results show that in a system embodying an engine of the kind herein disclosed the overall heat rejection to the cooling air is of the order of only 20% and of that only approximately 4% is taken from the motive fluid before commencement of the exhaust phase of the cycle, the latter percentage corresponding to only approximately 2% of the work done. Since the major portion of the heat rejected to the cooling air is rejected at relatively low temperature level from partially expanded or exhaust gases, and is returned to the system, the engine, when cooled by air subsequently converted to motive fluid, is substantially a true regenerator, in contrast to those types of apparatus such as gas turbines in which working surfaces are continuously exposed to inlet gas and from which they absorb large quantities of heat at high temperature level if attempt is made to cool them.

While as previously noted, the invention in its broader aspects is not restricted to the use of positive displacement compressors of the helical rotor type herein disclosed, such type, in addition to the advantages heretofore pointed out, is productive of further advantage from the standpoint of heat transfer for engine cooling purposes, when employed in power units of the type herein disclosed. Such further advantage is due primarily to the fact that the several positive displacement compression chambers, coming successively into communication with the outlet port, produce a high frequency pulsating discharge the frequency of which is a function of the speed of rotation of the compressor and the number of chambers discharging per revolution. With apparatus of the kind herein disclosed this frequency may be of the order of 60,000 to 80,000 or more per minute. If, now, as in the power units herein disclosed, the discharge from such a compressor is delivered more or less directly to the cooling passages of the engine, the pulsating or vibratory character of the flow insures a high rate of heat transfer from the walls of the passages to the air, since such flow is effective in preventing the formation and/or maintenance of the wall known stagnant molecular "boundary layer" of fluid which materially reduces the rate of heat transfer. When advantage is taken of the pulsating character of the discharge from a compressor of the preferred type, adequate cooling of the engine may be effected with the minimum quantity of cooling air, which, as shown in the system illustrated in Fig. 8 may be substantially less than the total quantity required to produce the motive fluid for operating the engine. In many other specific systems coming within the purview of this invention, it may be highly advantageous to be able to effect the necessary engine cooling with less than the total quantity of fluid delivered by the compressor side of the system.

The systems embodying the present invention have been described herein as applied to plants in which the motive fluid is formed by combustion of fuel with compressed air in a single combustion stage. It will be understood however that the invention is not limited in its application to the use of motive fluid formed by these specific constituents, since for example the compressed medium may be a combustible gas such as blast furnace gas or the like which is burned to form the hot motive fluid with further addition of fuel, or air may be compressed and heated in a surface type heater to provide the motive fluid. Also it will be apparent that the invention is not limited to systems having only single stage compression and/or combustion but is equally applicable to multiple stage plants embodying several units, as is well known in the gas turbine art. Furthermore, while in the illustrated embodiments the net useful energy for external load purposes has been shown as delivered in the form of mechanical power, such energy may be taken from the system in other forms, as for example in the form of compressed air from the compressor side of the system, which is sufficiently large to absorb the full power of the engine side and which produces compressed air in excess of the motive fluid requirements.

Novel features of construction of the prime mover per se, disclosed but not claimed herein, form the claimed subject matter of our copending application Serial No. 289,162, filed May 21, 1952, as a division and continuation-in-part of our aforementioned application, Serial No. 776,928.

From the foregoing it will be apparent that in its several aspects the invention may be embodied in widely different specific forms and combinations of apparatus, and that certain of the novel features disclosed may be used to the exclusion of others. The invention is therefore to be understood as embracing all forms of apparatus and modes of operation falling within the scope of the appended claims.

What is claimed is:

1. An elastic fluid power plant comprising compressor means, heating means for producing high temperature motive fluid from compressed elastic fluid delivered by said compressor means, power producing means operated by said motive fluid comprising a rotary positive displacement engine having a casing providing an inlet and an outlet for motive fluid, rotors mounted in said casing to rotate about coplanar axes and having intermeshing helical lands and grooves cooperating with each other and with the casing wall to form expansible chambers communicating successively with said inlet and said outlet as the rotors revolve, the walls of each of said chambers throughout the expansion and exhaust phases of the cycle of operation of the chamber including the surfaces of the inlet end portions of the lands and grooves defining the chamber, passages for flow of cooling fluid through said rotors in proximity to said surfaces to provide substantially uniform skin cooling thereof, and means for supplying cooling fluid to and exhausting cooling fluid from said passages.

2. Apparatus as defined in claim 1 in which said passages provide heat exchange surface of greater total area than that of the peripheral surfaces of the rotors.

3. Apparatus as defined in claim 1 in which said passages comprise a multiplicity of relatively small diameter bores extending longitudinally of the lands in parallel spaced relation near the surfaces of the lands.

4. Apparatus as defined in claim 1 in which the means for supplying cooling fluid to the rotor passages comprises conduit means for delivering fluid compressed by said compressor means.

5. Apparatus as defined in claim 4 in which cooling fluid exhausted from said passages is delivered to said heating means.

6. Apparatus as defined in claim 5, in which the conduit system for flow of cooling fluid from the compressor means through the cooling passages to the heating means is positively sealed to isolate the flow of cooling fluid from the flow of motive fluid.

7. In a rotary power unit, a housing assembly having an end wall, a compressor casing spaced from said end wall and an intermediate casing connecting the motor and compressor casings and providing a chamber, intermeshing rotors in said motor casing, each of said rotors having a body part provided with internal cooling passages and a hollow shaft part extending through said end wall into said chamber to provide communication between the chamber and the passages, an external bearing for supporting each of said shaft parts located between said end wall and said chamber, said compressor casing having an outlet for compressed fluid communicating with said chamber, seals between said shaft parts and said motor casing located on one side of said bearings, and seals between said shaft parts and the wall of said chamber located on the other side of said bearings, whereby to prevent fluid under pressure from flowing to said bearings from said motor casing or said chamber.

8. A power unit as defined in claim 7, in which a power shaft for driving the compressor extends from the body part of one of said rotors through the hollow shaft part thereof into said chamber.

9. In the operation of an elastic fluid power system of the kind in which a gaseous constituent of the motive fluid is compressed in a suitable compressor, heated in its compressed state by suitable heating means to provide the desired motive fluid and thereafter expanded in a separate prime mover of the positive displacement expansible chamber type having intermeshing rotors and providing the power required for compression, that improvement which comprises in utilizing at least a portion of the compressed gaseous constituent as a cooling medium for the rotors of said prime mover by conducting the same from said compressor through said rotors and to said heating means through a path of flow isolated from communication with the path of flow of the motive fluid from the heating means through the working chambers of the prime mover, heating the constituent conducted through the first mentioned path to convert the same to motive fluid, and conducting the motive fluid so formed through the second mentioned path to effect work producing expansion thereof.

10. In a power plant operated by expansion of high temperature elastic motive fluid, a prime mover for expanding said motive fluid to produce mechanical power therefrom, said prime mover comprising parts in contact with the hot expanding motive fluid and required to be cooled to be maintained at operative temperature, said parts having passages therein for flow of cooling fluid, and rotary compressor means for delivering a high frequency pulsating supply of elastic cooling fluid to said passages.

11. A power unit for plants operated by elastic motive fluid comprising a rotary compressor of the helical rotor type providing positive displacement working chambers operative as the rotors revolve to compress and discharge in rapid succession a series of separate increments of compressed elastic fluid, whereby to deliver a pulsating supply of compressed fluid, a rotary positive displacement motor of the helical rotor type for expanding high temperature elastic motive fluid to provide power for operating the compressor, said rotors being provided with passages for cooling fluid adjacent to the working surfaces of the rotors exposed to the motive fluid, and connections for supplying pulsating fluid from said supply to said passages to cool said rotors.

12. A power unit for plants operated by elastic motive fluid comprising a rotary compressor of the helical rotor type having a casing enclosing the rotors and providing positive displacement working chambers operative as the rotors revolve to compress and discharge in rapid succession a series of separate increments of compressed elastic fluid, whereby to deliver a pulsating supply of compressed fluid, a rotary positive displacement motor of the helical rotor type for expanding high temperature elastic motive fluid, said motor having a casing and rotors mounted therein, said rotors having shaft parts and body portions, said portions being provided with cooling passages adjacent to the working surfaces of the rotors exposed to the motive fluid, a housing structure connecting said compressor and motor casings and providing a chamber therebetween, the shaft parts of the rotors of said motor extending into said chamber and having passages therein providing communication between said chamber and the cooling passages in the body portions of the rotors, and said compressor casing having a discharge port communicating with said chamber.

13. A unit as defined in claim 12 including a direct driving connection extending through said chamber from one of the rotors of the motor to one of the rotors of the compressor.

14. A unit as defined in claim 12 in which the shaft parts extending into said chamber are hollow to provide inlets for flow of the compressed fluid from said chambers to said cooling passages and in which seals are provided between said shaft parts and the adjacent wall of said chamber.

15. An elastic fluid power system comprising compressor means for compressing a gaseous fluid constituent of the motive fluid, heating means for heating said gaseous fluid to produce high temperature motive fluid, a positive displacement rotary motor of the helical rotor type having expansible working chambers for expanding said motive fluid to produce power for operating said compressor means, the rotors of said motor having body parts provided with internal passages for cooling fluid and shaft parts providing inlets and outlets communicating with said passages for flow of said cooling fluid, a conduit for supplying compressed fluid from said compressor means to said passages, a conduit for conducting said fluid from said passages to said heating means, and positive seals associated with said shaft parts for isolating the path of flow of said cooling fluid through the rotors of the motor from the path of flow of the motive fluid through the motor.

16. A system as defined in claim 15 in which said seals are carbon ring seals externally engaging the shaft parts of the rotors.

17. A system as defined in claim 16 in which said rotor shafts are hollow and provide internal channels extending from said passages past said seals to communicate with said conduits.

TEODOR IMMANUEL LINDHAGEN.
HANS ROBERT NILSSON.

REFERENCES CITED

The following references are of record in the file of this patent:

UNITED STATES PATENTS

| Number | Name | Date |
|---|---|---|
| 1,287,268 | Edwards | Dec. 10, 1918 |
| 1,704,236 | Zuccarello | Mar. 5, 1929 |
| 1,938,688 | Brook | Dec. 12, 1933 |
| 1,960,810 | Gordon | May 29, 1934 |
| 2,164,462 | Lutschg | July 4, 1939 |
| 2,243,874 | Lysholm | June 3, 1941 |
| 2,410,172 | Lysholm | Oct. 29, 1946 |
| 2,445,837 | McKenzie | July 27, 1948 |
| 2,487,514 | Boestad | Nov. 8, 1949 |
| 2,618,120 | Papini | Nov. 18, 1952 |

FOREIGN PATENTS

| Number | Country | Date |
|---|---|---|
| 464,475 | Great Britain | Apr. 16, 1937 |
| 441,683 | Germany | Mar. 8, 1927 |
| 665,762 | Germany | Oct. 3, 1938 |
| 907,059 | France | June 11, 1945 |